Dec. 28, 1926.
R. MATSUMOTO
TRICYCLE
Filed Feb. 4, 1925
1,612,739
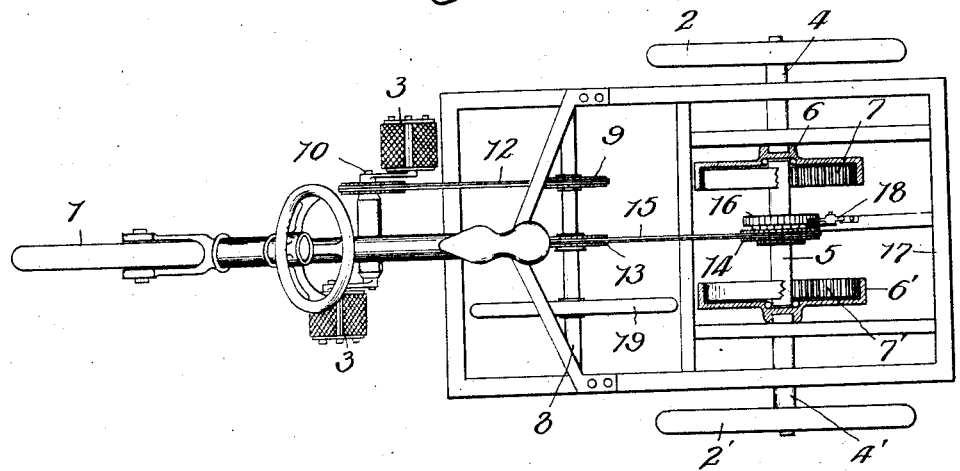

Patented Dec. 28, 1926.

1,612,739

UNITED STATES PATENT OFFICE.

RYUTARO MATSUMOTO, OF TOKYO, JAPAN.

TRICYCLE.

Application filed February 4, 1925. Serial No. 6,847.

My invention relates to tricycles, and more particularly to shaft connections of rear wheels of the cycles in the class as specified.

An object of my invention is to obtain a tricycle which can be lightly or easily started and can run smoothly.

Another object of my invention is to provide a tricycle of which the two rear wheels may be driven with different speeds to each other.

A further object of my invention is to provide a tricycle comprising rear wheels which have energy accumulating means whereby the driving may be facilitated.

In practising my invention, I provide a rear wheel driving means comprising two separate shafts for two rear wheels respectively, an intermediate shaft adapted to be driven by the rotating motion of pedalling means, spiral springs respectively interposed between both ends of the intermediate shaft and the adjacent ends of the said two shafts for rear wheels.

My invention may be fully and completely understood by the following description in connection with the accompanying drawings, wherein:

Fig. 1 is a side elevation of a tricycle embodying my invention, and Fig. 2 is a plan view of the same, each partly in section to show inner mechanisms.

Referring now to the drawings, my embodiment comprises a front wheel 1, a pair of rear wheels 2, 2', and pedals 3 and their mechanisms. The rear wheels have their shafts 4 and 4' respectively, between which an intermediate shaft 5 is disposed in alinement thereto. Each end of the intermediate shaft is connected to the adjacent end of each corresponding shaft 4 or 4', through spiral springs 7 or 7'. These springs are conveniently semi-enclosed within disk-type casings 6 and 6', which are respectively fixed to the inner ends of the shafts 4 and 4'. The casings 6 and 6' have annular projections surrounding the spring peripheries, to which projected portions the outer ends of the springs 7 and 7' are fixed respectively. The inner end of each spring is secured to the corresponding end portion of the intermediate shaft 5 which is journaled in the centre recesses of the casings 6 and 6', by any suitable means, such as ball bearings provided within said recesses. A transmission shaft 8 is disposed between the pedals 3 and the intermediate shaft 5, and is provided with a chain gear wheel 9 for cooperation with a driving chain 12, which is adapted to engage a driving chain gear wheel 11 on the pedals shaft 10. The transmission shaft 8 has another chain gear wheel 13 for cooperation with a gearing chain 15 adapted to gear with a third chain gear wheel 14 provided on the intermediate shaft 5. On a side face of the wheel 14 is provided a ratchet wheel 16 which is engaged by a claw 18 on the frame 17, whereby the intermediate shaft 5 is made impossible to rotate in the reverse direction. The connecting shaft 8 is provided with a fly-wheel 19 for usual purposes.

In driving, at the beginning of the starting, the pedals are stepped as usually, but the tricycle is not yet started until the rotating energy of the shaft 5 is fully accumulated in the spiral springs 7 and 7'. After these springs are wound up, further steppings of the pedals will drive the rear wheels and the tricycle may be lightly started. It is obvious that my tricycle can not be started immediately upon first steppings of the pedals, but take a certain time interval up to the actual starting, during which time interval the pedalling energy is accumulated in the spiral springs. This means, of course, a light or easy starting of the tricycle which is heavily loaded usually, and consequently the driver can step to drive the same with the least effort. It is also obvious that the accumulated energy in the spiral springs will facilitate a smooth running of the tricycle, while the said springs, being flexible, can compensate the difference of revolutions between the two rear wheels during an angular driving of the tricycle, facilitating the same.

While I have shown and described one embodiment of my said invention, it will be readily understood by those skilled in the art that various changes, substitutions, modifications, and omissions may be made therein, without departing from the spirit and scope thereof, as set forth in the appended claims.

Having now particularly described and ascertained the nature of my said invention and in what manner the same is to be performed, I declare that what I claim is:

1. In a tricycle, comprising a frame, a front wheel, a pair of rear wheels, pedalling means, driving chains driven by said pedalling means, a pair of shafts for said rear wheels, an intermediate shaft disposed therebetween and adapted to be driven by said driving chains, and means connecting said intermediate shaft to said pair of wheel shafts with energy accumulating resiliency.

2. In a tricycle, comprising a frame, a front wheel, a pair of rear wheels, pedalling means, driving chains driven by said pedalling means, a pair of shafts for said rear wheels, an intermediate shaft disposed therebetween and adapted to be driven by said driving chains, and a pair of spiral springs resiliently connecting said intermediate shaft to said pair of wheel shafts respectively.

3. In a tricycle, comprising a frame, a front wheel, a pair of rear wheels, pedalling means, driving chains driven by said pedalling means, a pair of shafts for said rear wheels, an intermediate shaft disposed therebetween and adapted to be driven by said driving chains and a pair of spiral springs, one end of each spring being secured to a lateral extension carried by said wheel shaft, the other end of each spring being secured to each end portion of said intermediate shaft.

4. In a tricycle, comprising a frame, a front wheel, a pair of rear wheels, pedalling means, a driving chain driven thereby, a transmission shaft driven by said chain, a pair of shafts for said rear wheels, flanged discs carried by the wheel shafts an intermediate shaft disposed therebetween in alinement therewith, a second driving chain driven by said transmitting shaft and adapted to drive said intermediate shaft, and a pair of spiral springs, one end of each spring being secured to the flanged disc on one of said wheel shafts, the other end of each spring being secured to each end portion of said intermediate shaft.

5. In a tricycle, comprising a frame, a front wheel, a pair of rear wheels, pedalling means, driving chains driven by said pedalling means, a pair of shafts for said rear wheels, an intermediate shaft disposed therebetween and adapted to be driven by said driving chains, a pair of spiral springs, a supporting member carried by the inner end of each wheel shaft and provided with a peripheral flange, one end of each spring being secured to the peripheral flange of one supporting member and the other end of said spring being secured to the adjacent portion of the inner shaft, and means to oppose the reverse rotation of the inner shaft.

In testimony whereof I have signed my name to this specification.

RYUTARO MATSUMOTO.